(12) United States Patent
Morioka et al.

(10) Patent No.: US 12,573,368 B2
(45) Date of Patent: Mar. 10, 2026

(54) RESIDUAL ADAPTERS FOR FEW-SHOT TEXT-TO-SPEECH SPEAKER ADAPTATION

(71) Applicant: Google LLC, Mountain View, CA (US)

(72) Inventors: Nobuyuki Morioka, Mountain View, CA (US); Byungha Chun, Tokyo (JP); Nanxin Chen, Mountain View, CA (US); Yu Zhang, Mountain View, CA (US); Yifan Ding, Mountain View, CA (US)

(73) Assignee: Google LLC, Mountain View, CA (US)

( * ) Notice: Subject to any disclaimer, the term of this patent is extended or adjusted under 35 U.S.C. 154(b) by 197 days.

(21) Appl. No.: 18/493,770

(22) Filed: Oct. 24, 2023

(65) Prior Publication Data

US 2024/0135915 A1    Apr. 25, 2024
US 2024/0233704 A9    Jul. 11, 2024

Related U.S. Application Data

(60) Provisional application No. 63/380,782, filed on Oct. 25, 2022.

(51) Int. Cl.
*G10L 13/027*      (2013.01)
*G06N 3/04*      (2023.01)
(Continued)

(52) U.S. Cl.
CPC .............. *G10L 13/027* (2013.01); *G06N 3/04* (2013.01); *G06N 3/045* (2023.01); *G06N 3/0455* (2023.01);
(Continued)

(58) Field of Classification Search
CPC ... G10L 13/027; G10L 13/047; G10L 13/033; G10L 13/02; G10L 13/08; G06N 3/04; G06N 3/045; G06N 3/0455; G06N 20/10
See application file for complete search history.

(56) References Cited

U.S. PATENT DOCUMENTS

2023/0111824 A1*   4/2023   Mukherjee ........... G06N 3/0464
                                 704/200

OTHER PUBLICATIONS

Huang et al, Meta-TTS: Meta-Learning for Few-Shot Speaker Adaptive Text-to-Speech, IEEE/ACM Transactions on audio, speech and language processing, Apr. 13, 2022, https://ieeexplore.ieee.org/abstract/document/9756900 (Year: 2022).*

(Continued)

*Primary Examiner* — Linda Wong
(74) *Attorney, Agent, or Firm* — Honigman LLP; Brett A. Krueger; Grant Griffith

(57) ABSTRACT

A method for residual adapters for few-shot text-to-speech speaker adaptation includes obtaining a text-to-speech (TTS) model configured to convert text into representations of synthetic speech, the TTS model pre-trained on an initial training data set. The method further includes augmenting the TTS model with a stack of residual adapters. The method includes receiving an adaption training data set including one or more spoken utterances spoken by a target speaker, each spoken utterance in the adaptation training data set paired with corresponding input text associated with a transcription of the spoken utterance. The method also includes adapting, using the adaption training data set, the TTS model augmented with the stack of residual adapters to learn how to synthesize speech in a voice of the target speaker by optimizing the stack of residual adapters while parameters of the TTS model are frozen.

22 Claims, 7 Drawing Sheets

(51) Int. Cl.

| | |
|---|---|
| *G06N 3/045* | (2023.01) |
| *G06N 3/0455* | (2023.01) |
| *G06N 20/10* | (2019.01) |
| *G10L 13/02* | (2013.01) |
| *G10L 13/033* | (2013.01) |
| *G10L 13/047* | (2013.01) |
| *G10L 13/08* | (2013.01) |

(52) U.S. Cl.
CPC .............. *G06N 20/10* (2019.01); *G10L 13/02* (2013.01); *G10L 13/033* (2013.01); *G10L 13/047* (2013.01); *G10L 13/08* (2013.01)

(56) References Cited

OTHER PUBLICATIONS

Liu et al, Meta-Voice: Fast Few Shot Style Transfer for Expressive Voice Cloning Using Meta Learning, Nov. 14, 2021 (Year: 2021).*

Zen et al, LibriTTS: A Corpus Derived from LIbriSpeech for Text to Speech, https://arxiv.org/abs/1904.02882#:~:text=This%20paper% 20introduces%20a%20new,download%20from%20this%20http% 20URL, Apr. 5, 2019 (Year: 2019).*

Pham et al, A study of Residual Adapters for Multi-domain Neural Machine Translation, Nov. 19, 2020, https://hal.science/hal-03013197/, pp. 615-626 (Year: 2020).*

Morioka et al, Residual Adapters for Few-shot text to speech speaker adaptation, Oct. 28, 2022, https://arxiv.org/abs/2210.15868 (Year: 2022).*

Songxiang Liu et al: "Meta-Voice: Fast few-shot style transfer for expressive voice cloning using meta learning", arvix.org, Cornell University Library, 201 Olin Library Cornell University Ithaca, NY 14853, Nov. 14, 2021 (Nov. 14, 2021), XP091098511.

Yi Ren et al: "FastSpeech 2: Fast and High-Quality End-to-End Text to Speech", arvix.org, Cornell University Library, 201 Olin Library Cornell University Ithaca, NY 14853, Oct. 16, 2020 (Oct. 16, 2020), XP081787811.

Jonas Pfeiffer et al: "AdapterHub: A Framework for Adapting Transformers", arvix.org, Cornell University Library, 201 Olin Library Cornell University Ithaca, NY 14853, Jul. 15, 2020 (Jul. 15, 2020), XP081721291.

International Search Report and Written Opinion issued in related PCT Application No. PCT/US2023/035838, dated Feb. 12, 2024.

* cited by examiner

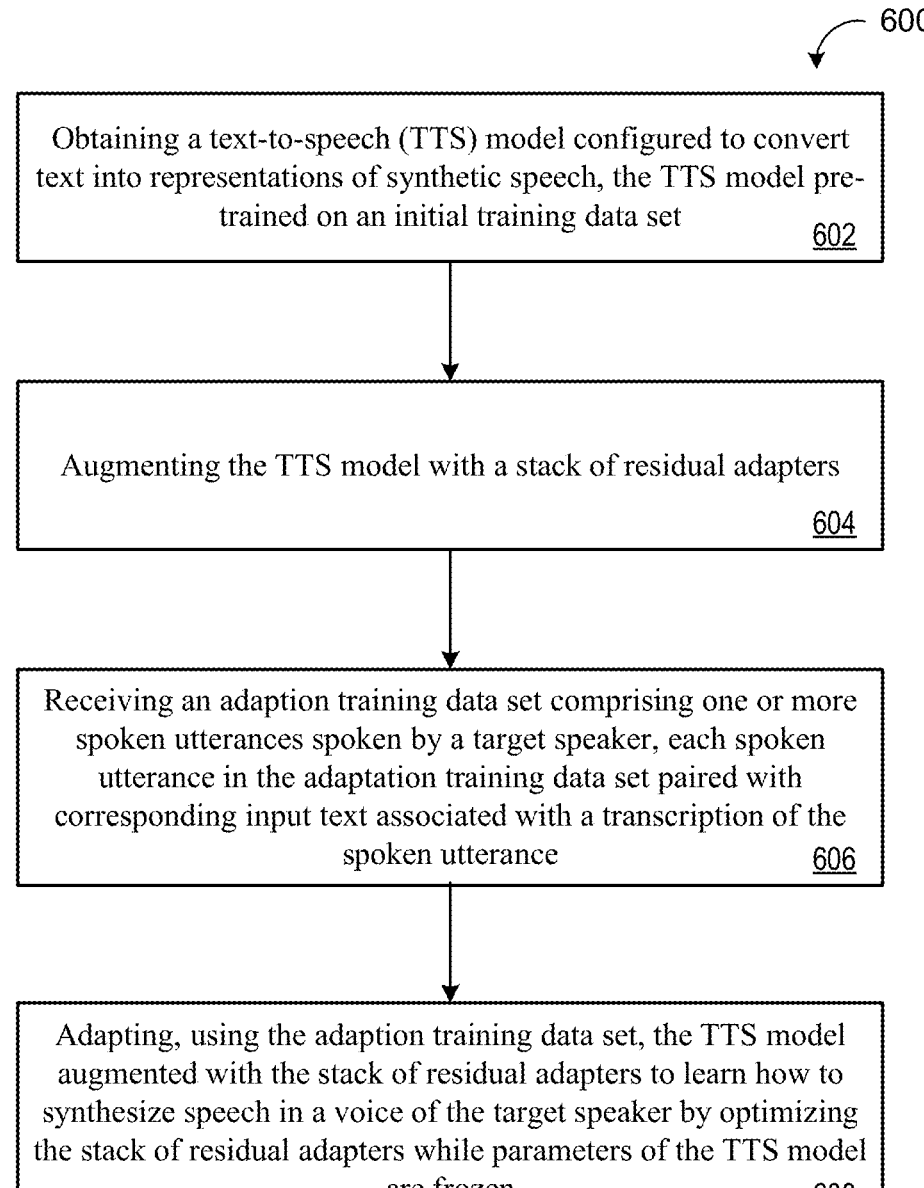

600

Obtaining a text-to-speech (TTS) model configured to convert text into representations of synthetic speech, the TTS model pre-trained on an initial training data set
602

Augmenting the TTS model with a stack of residual adapters
604

Receiving an adaption training data set comprising one or more spoken utterances spoken by a target speaker, each spoken utterance in the adaptation training data set paired with corresponding input text associated with a transcription of the spoken utterance
606

Adapting, using the adaption training data set, the TTS model augmented with the stack of residual adapters to learn how to synthesize speech in a voice of the target speaker by optimizing the stack of residual adapters while parameters of the TTS model are frozen
608

FIG. 6

RESIDUAL ADAPTERS FOR FEW-SHOT TEXT-TO-SPEECH SPEAKER ADAPTATION

CROSS REFERENCE TO RELATED APPLICATIONS

This U.S. patent application claims priority under 35 U.S.C. § 119(e) to U.S. Provisional Application 63/380,782, filed on Oct. 25, 2022. The disclosure of this prior application is considered part of the disclosure of this application and is hereby incorporated by reference in its entirety.

TECHNICAL FIELD

This disclosure relates to residual adapters for few-shot text-to-speech speaker adaptation.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional speech synthesis models are capable of providing intelligible speech, recent advances in neural modeling of speech have significantly improved the naturalness and fidelity of synthesized speech. These neural models are large, having millions of parameters that can be fine-tuned during training. Due to the size of these models, training can be a lengthy and computationally expensive process.

SUMMARY

One aspect of the disclosure provides a computer-implemented method for implementing residual adapters for few-shot text-to-speech speaker adaptation. The computer-implemented method is executed by data processing hardware that causes the data processing hardware to perform operations including obtaining a text-to-speech (TTS) model configured to convert text into representations of synthetic speech, the TTS model pre-trained on an initial training data set. The operations further include augmenting the TTS model with a stack of residual adapters. The operations include receiving an adaption training data set including one or more spoken utterances spoken by a target speaker, each spoken utterance in the adaptation training data set paired with corresponding input text associated with a transcription of the spoken utterance. The operations include adapting, using the adaption training data set, the TTS model augmented with the stack of residual adapters to learn how to synthesize speech in a voice of the target speaker by optimizing the stack of residual adapters while parameters of the TTS model are frozen.

Implementations of the disclosure may include one or more of the following optional features. In some implementations, the TTS model includes a decoder including a corresponding stack of multi-head self-attention layers. In some implementations, augmenting the TTS model with the stack of residual adapters includes inserting the stack of residual adapters into the decoder, each respective residual adapter in the stack of residual adapters disposed between each multi-head self-attention layer in the corresponding stack of multi-head self-attention layers of the decoder. In these implementations, the selected decoder may include a Conformer decoder including a first feedforward module, a multi-head self-attention module, a convolution module, a second feedforward module, and a layernorm module.

In some implementations, each spoken utterance in the adaptation training data set includes a corresponding non-synthetic speech representation of the target speaker speaking the spoken utterance. In these implementations, the stack of residual adapters is optimized by for each spoken utterance in the adaption training data set, generating, using the TTS model augmented with the stack of residual adapters, a corresponding synthetic speech representation from the corresponding input text paired with the spoken utterance, determining a loss based on the non-synthetic speech representations of the target speaker speaking the spoken utterances and the synthetic speech representations generated from the input text, and updating parameters of the stack of residual adapters based on the loss. In these implementations, the stack of residual adapters may further be optimized by optimizing a speaker embedding associated with the target speaker.

The initial training data set used to pre-train the TTS model may not include any utterances spoken by the target speaker. The input text paired with each corresponding spoken utterance in the adaption training data set may include a corresponding sequence of phonemes and a corresponding sequence of graphemes. In some implementations, each respective residual adaptor in the stack of residual adapters includes a layernorm layer, a down-projection layer, a Rectified Linear Unit (ReLU) layer, an up-projection layer, and a residual connection.

In some implementations, the TTS model includes a Bidirectional Encoder Representations from Transformers (BERT) encoder configured to receive the corresponding input text for each spoken utterance in the adaption training data set, and generate an encoded text representation for the corresponding input text utterance. In these implementations the TTS model may also include a variance adapter configured to receive a first concatenation output comprising a speaker embedding and a stress embedding concatenated with the encoded text representation generated by the BERT encoder, and generate an output corresponding to the first concatenation output. In these implementations, the TTS model may also include a duration adapter configured to receive the first concatenation output and predict a phoneme duration for each phoneme in the corresponding input text based on the first concatenation output. Further, in these implementations, the TTS model may include an upsampler configured to receive a second concatenation output comprising the first concatenation output concatenated with the output generated by the variance adapter, and upsample the second concatenation output. In these implementations, the TTS model may also include a decoder configured to receive the upsampled second concatenation output, and generate a synthetic speech representation for the corresponding input text.

The initial training data set may pre-train the TTS model to synthesize speech in a first language. Here, each spoken utterance in the adaptation training data set is spoken in a second language different than the first language.

Another aspect of the disclosure provides a system for implementing residual adapters for few-shot text-to-speech speaker adaptation. The system includes data processing hardware and memory hardware in communication with the data processing hardware. The memory hardware stores instructions that when executed on the data processing hardware cause the data processing hardware to perform operations. The operations include obtaining a text-to-speech (TTS) model configured to convert text into representations of synthetic speech, the TTS model pre-trained on an initial training data set. The operations further include augmenting the TTS model with a stack of residual adapters. The operations include receiving an adaption training data set including one or more spoken utterances spoken by a target speaker, each spoken utterance in the adaptation training data set paired with corresponding input text associated with a transcription of the spoken utterance. The operations include adapting, using the adaption training data set, the TTS model augmented with the stack of residual adapters to learn how to synthesize speech in a voice of the target speaker by optimizing the stack of residual adapters while parameters of the TTS model are frozen.

This aspect may include one or more of the following optional features. In some implementations, the TTS model includes a decoder including a corresponding stack of multi-head self-attention layers. In some implementations, augmenting the TTS model with the stack of residual adapters includes inserting the stack of residual adapters into the decoder, each respective residual adapter in the stack of residual adapters disposed between each multi-head self-attention layer in the corresponding stack of multi-head self-attention layers of the decoder. In these implementations, the decoder may include a Conformer decoder including a first feedforward module, a multi-head self-attention module, a convolution module, a second feedforward module, and a layernorm module.

In some implementations, each spoken utterance in the adaptation training data set includes a corresponding non-synthetic speech representation of the target speaker speaking the spoken utterance. In these implementations, the stack of residual adapters is optimized by for each spoken utterance in the adaption training data set, generating, using the TTS model augmented with the stack of residual adapters, a corresponding synthetic speech representation from the corresponding input text paired with the spoken utterance, determining a loss based on the non-synthetic speech representations of the target speaker speaking the spoken utterances and the synthetic speech representations generated from the input text, and updating parameters of the stack of residual adapters based on the loss. In these implementations, the stack of residual adapters may further be optimized by optimizing a speaker embedding associated with the target speaker.

The initial training data set used to pre-train the TTS model may not include any utterances spoken by the target speaker. The input text paired with each corresponding spoken utterance in the adaption training data set may include a corresponding sequence of phonemes and a corresponding sequence of graphemes. In some implementations, each respective residual adaptor in the stack of residual adapters includes a layernorm layer, a down-projection layer, a Rectified Linear Unit (ReLU) layer, an up-projection layer, and a residual connection.

In some implementations, the TTS model includes a Bidirectional Encoder Representations from Transformers (BERT) encoder configured to receive the corresponding input text for each spoken utterance in the adaption training data set, and generate an encoded text representation for the corresponding input text utterance. In these implementations the TTS model may also include a variance adapter configured to receive a first concatenation output comprising a speaker embedding and a stress embedding concatenated with the encoded text representation generated by the BERT encoder, and generate an output corresponding to the first concatenation output. In these implementations, the TTS model may also include a duration adapter configured to receive the first concatenation output and predict a phoneme duration for each phoneme in the corresponding input text based on the first concatenation output. Further, in these implementations, the TTS model may include an upsampler configured to receive a second concatenation output comprising the first concatenation output concatenated with the output generated by the variance adapter, and upsample the second concatenation output. In these implementations, the TTS model may also include a decoder configured to receive the upsampled second concatenation output, and generate a synthetic speech representation for the corresponding input text.

The initial training data set may pre-train the TTS model to synthesize speech in a first language. Here, each spoken utterance in the adaptation training data set is spoken in a second language different than the first language.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 a flowchart of an example arrangement of operations for a method of implementing residual adapters for few-shot text-to-speech speaker adaptation.

Like reference symbols in the various drawings indicate like elements.

DETAILED DESCRIPTION

Few-shot speaker adaptation continues to be an important area of research in text-to-speech synthesis (TTS) because of growing interests in many different commercial custom voice applications (e.g., personalized voice assistants in low resource scenarios). Typical few-shot speaker adaptation approaches involve adapting a pre-trained multi-speaker backbone acoustic model to a target speaker by fine-tuning all or a partial set of model parameters. However, scaling such approaches to thousands of speakers is difficult, as the model serving cost normally grows linearly in the number of supported target speakers. Furthermore, in some cases, they require supplementary data (e.g., training data used for pretraining the backbone model) during adaptation to avoid over-fitting and/or catastrophic forgetting.

Implementations herein are directed to a parameter-efficient few-shot speaker adaptation approach based on residual adapters for text-to-speech. During adaptation, a pretrained multi-speaker TTS backbone model is frozen but augmented with simple/lightweight neural modules called residual adapters whose parameters are optimized to synthesize a target speaker voice, thereby allowing the same backbone model to be shared across many different speakers for inference. The approach described herein is more flexible than the aforementioned fine-tuning approaches as the size of the layers in the backbone model is fixed, but the size of the residual adapters can be adjusted accordingly to the task at hand. Also, as the residual adapters are usually tiny, requiring 0.1% of additional parameters to the backbone model, it can prevent the serving cost from growing linearly in the number of target speakers. Further, as the current approach freezes the backbone model during the speaker adaptation phase, the quality of the speakers included in the backbone model is unaffected by design.

Figure 1:
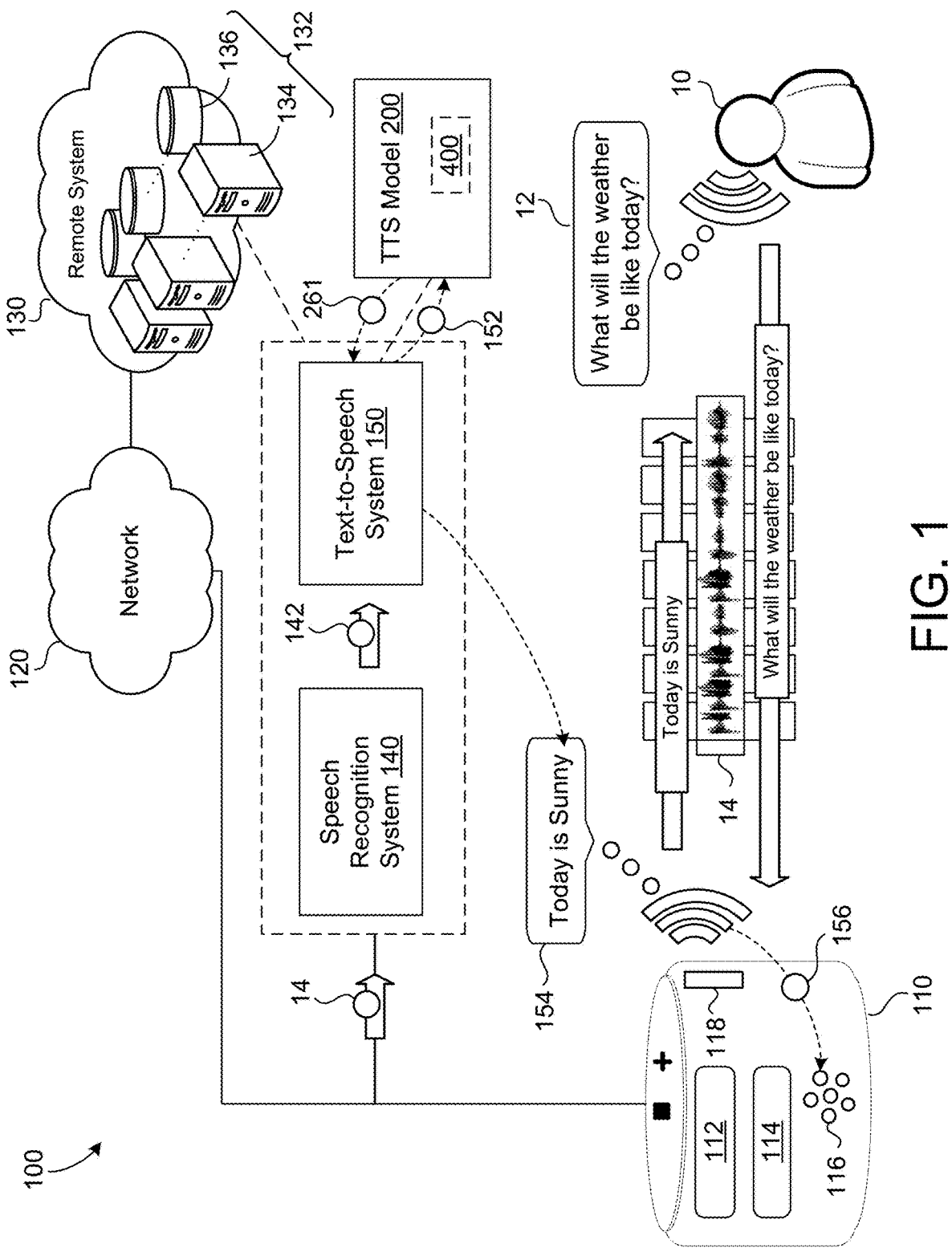
FIG. 1 is a schematic view of an example system for residual adapters for few-shot text-to-speech speaker adaptation.

Referring to FIG. 1, in some implementations, a speech environment 100 includes a user 10 (also referred to herein as a target speaker 10) communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110 or to have the device 110 execute a task specified by the query. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 (e.g., a digital assistant interface) may field the query for the command by answering the query and/or causing the command to be performed.

Here, the device 110 captures audio data 14 corresponding to the spoken utterance 12 by the user 10. The device 110 may correspond to any computing device associated with the user 10 and capable of receiving audio data 14. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech and/or text processing. In some examples, the device 110 includes one or more applications (i.e., software applications) where each application may utilize one or more speech processing systems/models 140, 150, 200 associated with device 110 to perform various functions within the application. For instance, the device 110 includes an assistant application configured to communicate synthesized playback audio 154 (also referred to as synthesized speech 154) to the user 10 to converse with the user 10 and assist with the performance of various tasks.

The device 110 further includes an audio subsystem with an audio capturing device (e.g., a microphone) 116 for capturing and converting audio data 14 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle. Similarly, the speech output device 118 may include one or more speakers either residing on the device 110, in communication therewith, or a combination where one or more speakers reside on the device 110 and one or more other speakers are physically removed from the device 110 but in communication with the device 110.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using a speech recognition system 140 and/or conversion of text to speech using a TTS system 150 (e.g., using the TTS model 200). These systems/models 140, 150, 200 may reside on the device 110 (referred to as on-device systems) or reside remotely (e.g., reside on the remote system 130), but in communication with the device 110. In some examples, some of these systems 140, 150, 200 reside locally or on-device while others reside remotely. In other words, any of these systems 140, 150, 200 may be local, remote, or both in any combination. For instance, when a system 140, 150, 200 is rather large in size or processing requirements, the system 140, 150, 200 may reside in the remote system 130. Yet when the device 110 may support the size or the processing requirements of one or more systems 140, 150, 200, the one or more systems 140, 150, 200 may reside on the device 110 using the data processing hardware 112 and/or the memory hardware 114. Optionally, the one or more of the systems 140, 150, 200 may reside on both locally/on-device and remotely. For instance, one or more of the systems 140, 150, 200 may default to execute on the remote system 130 when a connection to the network 120 between the device 110 and remote system 130 is available, but when the connection is lost or the network 120 is unavailable, the systems 140, 150, 200 instead execute locally on the device 110. In some implementations, the TTS model 200 may be a large trained model that resides on a server (i.e., remote system 130) and is further configured with a residual adapter 400 that is trained based on a target speaker (i.e., user 10 associated with the device 110).

A speech recognition system 140 receives audio data 14 as an input and transcribes that audio signal into a transcription 142 as an output. Generally speaking, by converting the audio data 14 into a transcription 142, the speech recognition system 140 allows the device 110 to recognize when a spoken utterance 12 from the user 10 corresponds to a query, a command, or some other form of audio communication. That is, the speech recognition system 140 may include natural language understanding (NLU) functionality to perform query interpretation (e.g., semantic analysis) on the transcription 142. The transcription 142 refers to a sequence of text that the device 110 may then use to generate a response to the query or the command. For instance, if the user 10 asks the device 110 the question of "what will the weather be like today," the device 110 passes the audio data 14 corresponding to the question "what will the weather be like today" to the speech recognition system 140. The speech recognized system 140 converts the audio data 14 into a transcript 142 that includes the text of "what will the weather be like today?" The device 110 may then determine a response to the query using the text or portions of the text. For instance, in order to determine the weather for the current day (i.e., today), the device 110 passes the text (e.g., "what will the weather be like today?") or identifying portions of the text (e.g., "weather" and "today") to a search engine. The search engine may then return one or more search results that the device 110 interprets to generate a response for the user 10.

In some implementations, the device 110 or a system associated with the device 110 identifies text 152 (also referred to as a sequence of text 152 or input text 152) that the device 110 will communicate to the user 10 as a response to a query of the spoken utterance 12. The device 110 may then use the TTS system 150 to convert the text 152 into corresponding synthesized playback audio 154 for the device 110 to communicate to the user 10 (e.g., audibly communicate to the user 10) as the response to the query of the spoken utterance 12. In other words, the TTS system 150 receives, as input, text 152 and converts the text 152 to an output of synthesized playback audio 154 (e.g., through a series of neural networks) where the synthesized playback audio 154 is an audio signal defining an audible rendition of the text 152. For example, the playback audio 154 is a verbalization or a narration of the input text 152. In some examples, the input text 152 refers to a sequence of text or characters in a particular natural language (e.g., English, Spanish, or French). The sequence of characters can include letters, numbers, punctuation marks, and/or other special characters. When the TTS system 150 generates the playback audio 154, the playback audio 154 includes synthesized speech that approximates how a human would verbalize the sequence of characters defining the input text 152.

The TTS system 150 (or other speech synthesis system) includes a TTS model 200 (e.g., the TTS model 200 of FIG. 2) that utilizes a deep neural network (e.g., an attention-based Tacotron network) to generate the synthesized playback audio 154. In some implementations, the TTS model 200 generates a synthesized speech representation 261 based on the input text 152, which is then further converted into the synthesized playback audio 154. In some implementations, the TTS model 200 processes embeddings that are encoded representations of speech features (e.g., features of the input text 152) to generate audio waveforms (e.g., time-domain audio waveforms that define an audio signal's amplitude over time). Once generated, the TTS system 150 communicates the synthesized playback audio 154 to the device 110 to allow the device 110 to output the synthesized playback audio 154. For instance, the device 110 audibly outputs the synthesized playback audio 154 of "today is sunny" from the one or more speakers 118. Here, the TTS model 200 of the TTS system 150 is configured to control the speech-related attributes of the synthesized speech 154. In other words, the TTS model 200 is configured to simulate the voice of a human speaker in terms of naturalness while also being able to generate diverse synthesized speech by modeling fine-grained latent features.

In some implementations, the TTS model 200 is augmented with one or more residual adapters 400 (i.e. a stack of residual adapters 400). For example, a TTS model 200 may include a base/backbone model that is trained one a large set of user data for a large number of users. The base model portion of the TTS model 200 may then be frozen, and the one or more residual adapters 400 may then be trained to learn how to synthesize speech in a voice of a target speaker (e.g., speaker 10 associated with device 110). The one or more residual adapters 400 may go through a training process (FIG. 5), where the residual adapters are optimized for the target speaker. The residual adapters 400 may be inserted at various points within the TTS model 200.

Although FIG. 1 depicts an example of a TTS system 150 in the context of an assistant application, the TTS system 150 (e.g., using the TTS model 200) is applicable in other text-to-speech scenarios, such as, for example, voice search, navigation or reading documents.

Figure 2:
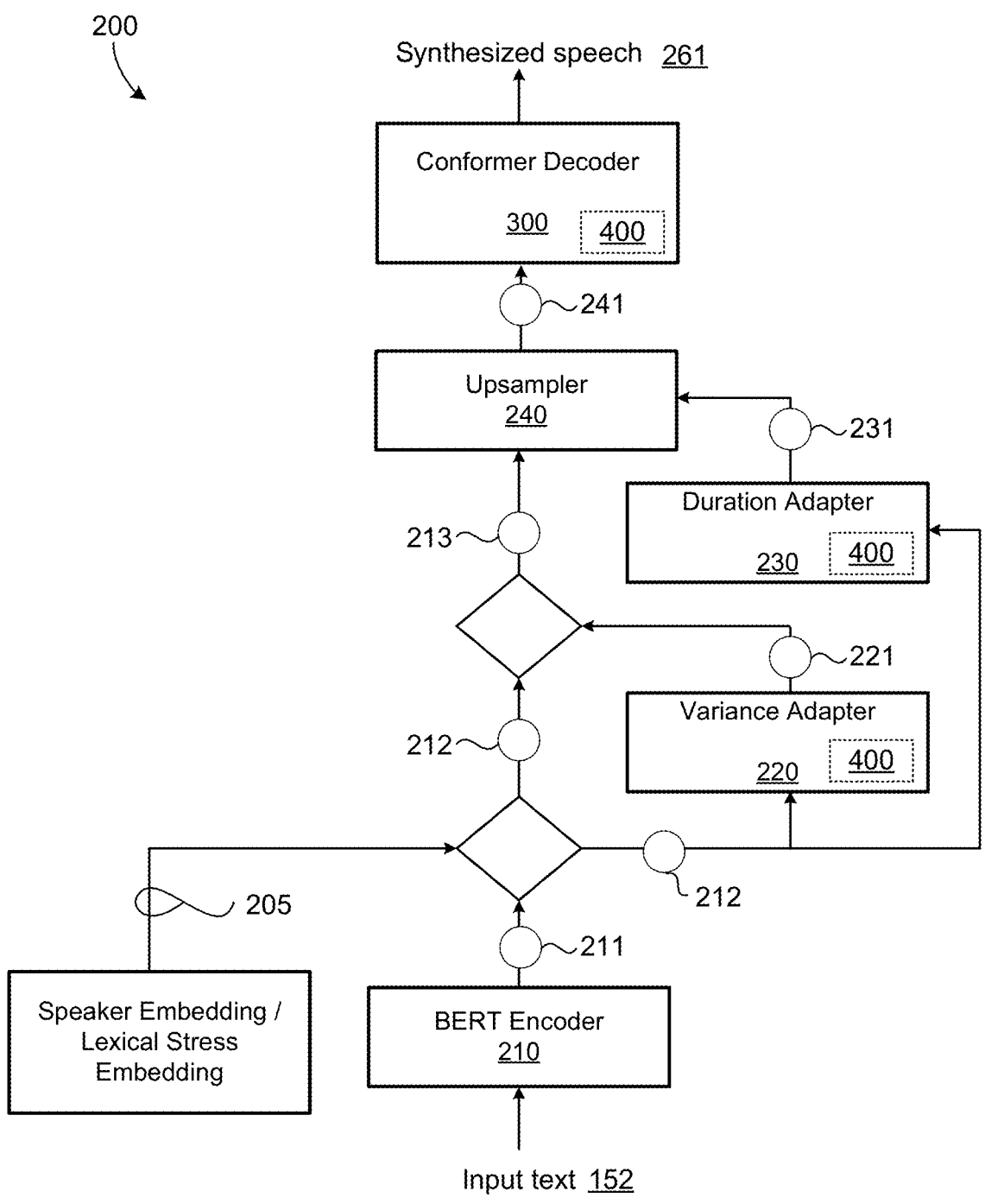
FIG. 2 is a schematic view of an example text-to-speech model configured with residual adapters.

FIG. 2 illustrates an example TTS model 200 that is adapted to synthesize speech in the voice of a target speaker using residual adapters 400. The TTS model 200 may include one or more components including a speaker embedding and/or lexical stress embedding 205, a Bidirectional Encoder Representation from Transformers (BERT) encoder 210, a variance adapter 220, a duration adapter 230, an upsampler 240, and/or a decoder 300. The decoder 300 may include a plurality of multi-head attention layers. For example, the decoder 300 may include a Conformer decoder. While the present disclosure will refer to the decoder 300 as a Conformer decoder 300, other decoders having multi-head attention layers are contemplated without departing from the scope of the present disclosure. The TTS model 200, using the various components 205, 210, 220, 230, 240, and/or 300 is configured to receive an input text 152 (e.g., in the form of phoneme & grapheme sequences) and output a synthesized speech representation 261 of the input text 152 (e.g., a mel-spectrogram). In some implementations, to convert the synthesized speech representation 261 corresponding to a mel-spectrogram in the frequency domain into a time-domain audio waveform corresponding to synthesized playback audio 154, the TTS system 150 may implement a vocoder (not shown). In some examples, the TTS system 150 implements a neural network-based vocoder such as a speaker-independent universal pretrained WaveRNN-based neural vocoder.

The speaker embedding and/or lexical stress embedding 205 may influence the timbre or other elements of the final output synthesized speech 261. The BERT encoder 210 may receive input text 152 and generate an encoded text representation 211 for the corresponding input text. The variance adapter 220 may receive a first concatenation output 212 including a speaker embedding and a stress embedding 205 (e.g., from speaker embedding and/or lexical stress embedding 205) concatenated with the encoded text representation 211 from the BERT encoder 210. The variance adapter 220 may then generate an output 221 based on the first concatenation output 212. Further, the duration adapter 230 may also be configured to receive the first concatenation output 212 and predict a phoneme duration 231 for each phoneme in the corresponding input text 152 based on the first concatenation output 212. The upsampler 240 may be configured to receive a second concatenation output 213 based on a concatenation of the output 221 generated by the variance adapter 220 and the first concatenation output 212. Based on the phoneme duration 231 predicted for each phoneme in the corresponding input text 152, the upsampler 231 may upsample the second concatenation output 231 and the Conformer decoder 300 may generate a synthetic speech representation 261 for the corresponding input text 152 based on the upsampled second concatenation output 241.

Figure 5:
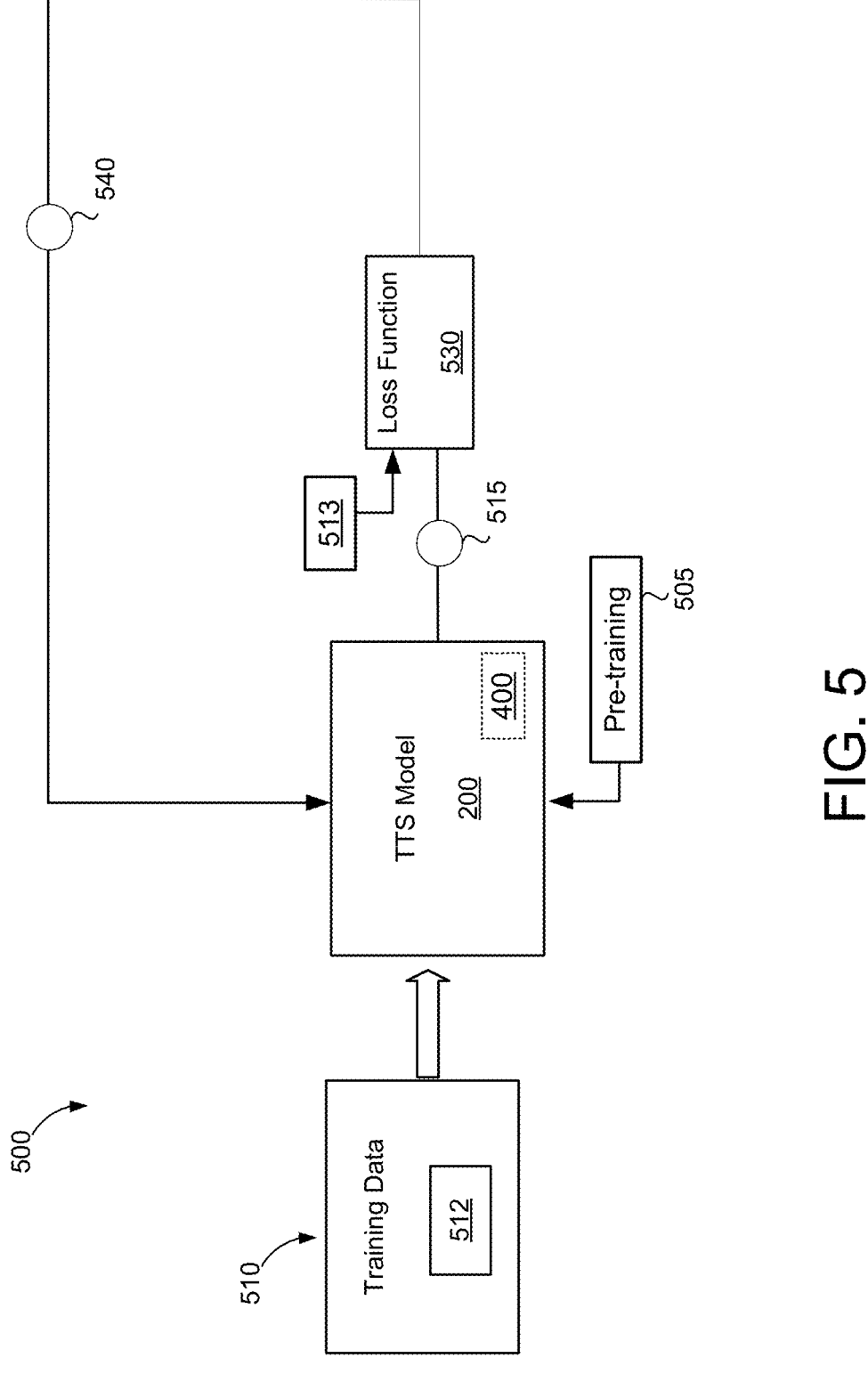
FIG. 5 is a schematic view of an example training process for a text-to-speech model configured with residual adapters.

In some implementations, the components 205, 210, 220, 230, 240, 300 (also referred to as submodels) of the TTS model 200 are optimized during pre-training of the TTS model 200 (FIG. 5). The TTS model 200 may be further adapted, by disposing one or more stacks of residual adapters 400 at the various components 205, 210, 220, 230, 240, 300 of the TTS model 200, to synthesize speech in the voice of a target speaker. Though FIG. 2 illustrates the residual adapter 400 disposed in the variance adapter 220, duration adapter 230, and/or Conformer decoder 300, the residual adapters 400 may be disposed in any of the components 205, 210, 220, 230, 240, 300. In some implementations, multiple residual adapters 400 may be disposed throughout the TTS model 200. During training of the residual adapters 400, the parameters of the components 205, 210, 220, 230, 240, 300 may be frozen. In other words, while the TTS model 200 and the residual adapters 400 may be used to generate outputs based on the training data, only the residual adapters 400 are optimized based on a loss. Training the residual adapters 400 is discussed in greater detail below (FIG. 5).

In some implementations, the TTS model 200 is a non-autoregressive variant of PnG NAT (Phoneme-and-Grapheme Non-Attentive Tacotron) that replaces an autoregressive LSTM-based decoder with a non-autoregressive Conformer-based decoder. In these implementations, instead of a decoder implementing long short-term memory (LSTM), the Conformer decoder 300 implementing multiple multi-head attention layers is more easily adapted by the residual adapters 400.

The TTS model 200 may receive input text 152 corresponding to both phoneme and grapheme sequences and subsequently output synthesized speech representations 261 as 128-bin mel-spectrograms with a 50 ms frame window and a 12.5 ms frame step. In some implementations, the TTS model 200 includes PnG BERT (Bidirectional Encoder Representations from Transformers) encoders (BERT encoder 210), 6 stacked Conformer decoders 300, a duration-based Gaussian upsampler 240 and convolution-based variance adapters 220, 230 predicting log duration, log FO and energy at the phoneme level like FastPitch. In these implementations, the encoder output 211 is concatenated with utterance-level speaker and lexical stress embeddings 205 that are broadcasted to the phoneme level before the variance and duration adapters 220, 230 apply conditioning. Prior to the upsampler 240, log FO and energy are concatenated to the encoder output 211 with the speaker and lexical stress embeddings 205.

In some implementations, TTS model 200 is first pre-trained on a large text corpus, such as Wikipedia, with a masked language model (MLM) objective and then used to initialize the encoder 210. To prevent possible overfitting, both phoneme and grapheme embeddings and the lower 4 encoder layers 210 are frozen while pre-training the TTS model 200.

Figure 3:
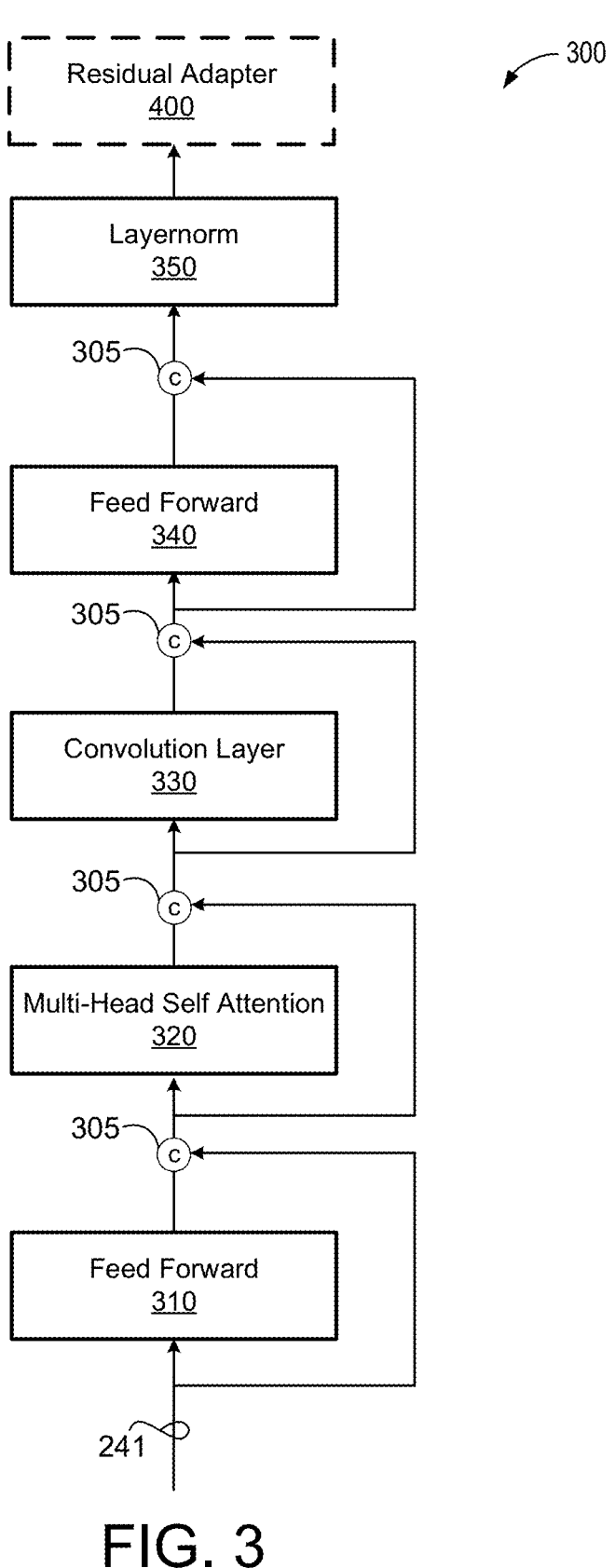
FIG. 3 is a schematic view of an example Conformer decoder configured with residual adapters.

FIG. 3. provides an example of a Conformer block/layer implemented by the Conformer decoder 300 of the TTS model 200. The Conformer decoder 300 includes a first half feed-forward layer 310, a second half feed-forward layer 340, with a multi-head self-attention block 320 and a convolution layer 330 disposed between the first and second half feed-forward layers 310, 340, and concatenation operators 305. The first half feed-forward layer 310 processes the upsampled second concatenation output 241 for the sequence of input text 152. Subsequently, the multi-head self-attention block 320 receives the upsampled second concatenation output 241 concatenated with the output of the first half-feed forward layer 310. A convolution layer 330 subsamples the output of the multi-head self-attention block 320 concatenated with the output of the first half feed forward layer 310. Thereafter, a second half-feed forward layer 340 receives a concatenation of the convolution layer 330 output and the multi-head self-attention block 320. A layernorm module 350 processes the output from the second half feed-forward layer 340. Mathematically, the Conformer block 300 transforms input features x, using modulation features m, to produce output features y, as follows:

$$\hat{x}=x+r(m)\odot x+h(m)$$

$$\tilde{x}=\hat{x}+\tfrac{1}{2}FFN(\hat{x}),\ \tilde{n}=n+\tfrac{1}{2}FFN(n)$$

$$x'=\tilde{x}+\text{Conv}(\tilde{x}),n'=\tilde{n}+\text{Conv}(n)$$

$$x''=x'+MHCA(x',n')$$

$$x'''=x'\odot r(x'')+h(x'')$$

$$x''''=x'+MHCA(x',x''')$$

$$y=\text{LayerNorm}(x''''+\tfrac{1}{2}FFN(x'''')) \tag{2}.$$

In some implementations, a residual adapter 400 is inserted in the Conformer decoder 300. Although the residual adapter 400 is illustrated as being inserted at the end of the Conformer decoder 300, the residual adapter 400 may be inserted in any suitable component(s) of the Conformer decoder 300. For example, a stack of residual adapters 400 may be inserted in the multi-head self-attention layer 320 of the Conformer decoder 300. In this example, each residual adapter 400 of the stack of residual adapters 400 is disposed between each multi-head self-attention layer 320 in the corresponding stack of multi-head self-attention layers 320 of the Conformer decoder 300. Further, as discussed above, the residual adapters 400 may be disposed in any suitable component(s) of the TTS model 200, such that the TTS model 200 is adapted to synthesize speech in the voice of a target speaker.

Figure 4:
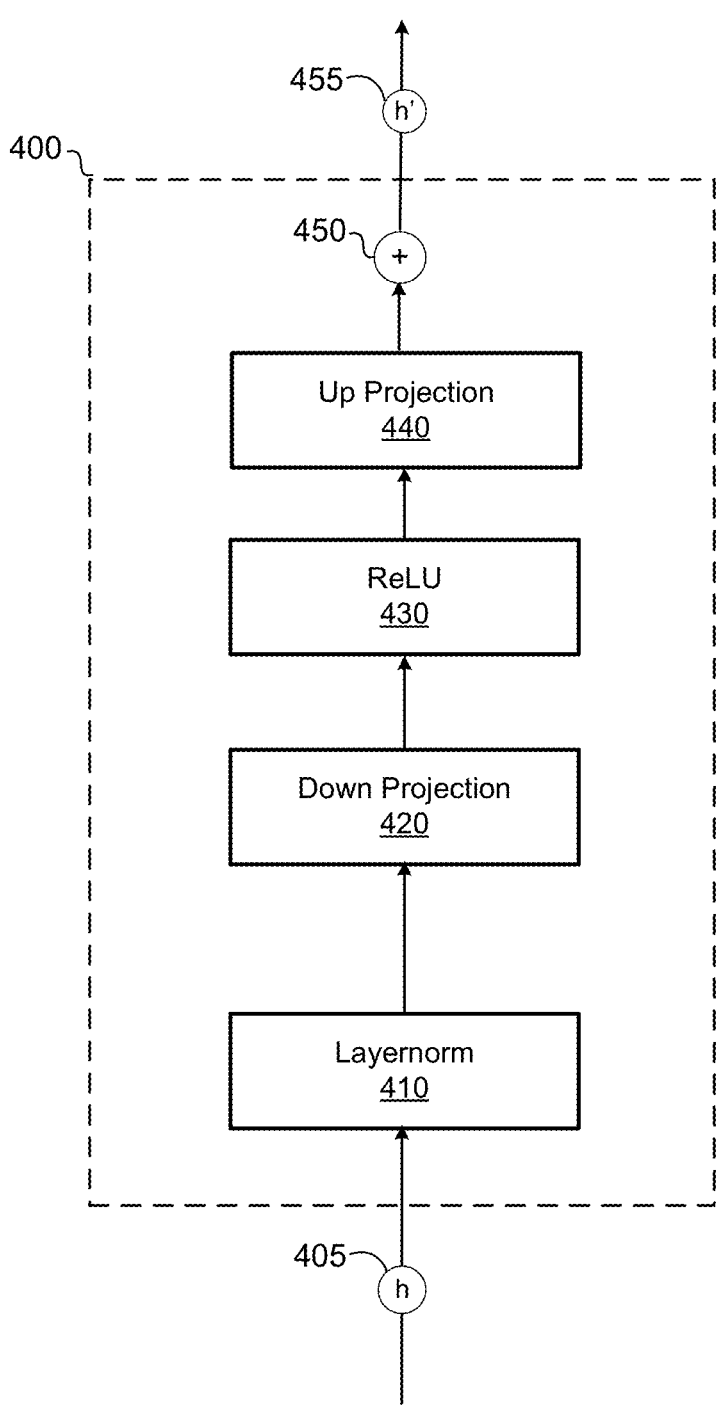
FIG. 4 is a schematic view of an example residual adapter.

In the example of FIG. 3, the residual adapter 400 can be used to further adapt the output of the Conformer 300 such that the output is a synthesized voice representation 261 of a target speaker that is trained on training data corresponding to the target speaker. FIG. 4 illustrates an example residual adapter 400. The residual adapter may include a layernorm layer 410, a down-projection layer 420, a Rectified Liner Unit (ReLU) layer 430, an up-projection layer 440 and a residual connection 450. In some implementations, the residual adapter 400 receives an input 405 (i.e., an output from a layer of the Conformer decoder 300). The residual adapter 400 then process the input 405 through the components 410, 420, 430, 440, and/or 450 to produce an output 455. In some implementations, the output 455 is a modified version of the input 405, such that the output 455 corresponds to a synthesized utterance in the voice of a target speaker.

In some implementations, to adapt a pre-trained TTS model 200 to a new target speaker, the TTS model may be adapted with residual adapters 400. The residual adapters may include lightweight neural modules which are inserted between layers of the TTS model 200. As illustrated in FIG. 4, each residual adapter 400 may include applying layer normalization to a d dimensional input vector $h\in R^d$ followed by down projecting to a bottleneck dimension r with $W\text{down}\in R^{d\times r}$, a ReLU activation, a up projection with Wup $\in_R r\times d$ and a residual connection, and has the following form:

$$h0=h+\text{ReLU}(\text{Layernorm}(h)W\text{down})W\text{up} \tag{3}$$

While the residual adapters 400 can be inserted anywhere in the TTS model 200, in some implementations the residual adapters 400 are most effective in the Conformer decoder 300. Further, in addition to optimizing the residual adapters 400, training may also optimize the speaker embedding such that the variance adapters 220, 230 (FIG. 2) are conditioned properly by the learned target speaker embedding. The TTS model 200 may be frozen, including moving mean and variance updates, during training/optimization of the residual adapters 400.

FIG. 5 illustrates a training process 500 for adapting a text-to-speech (TTS) model 200 augmented with a stack of residual adapters 400 to learn how to synthesize speech in a voice of a target speaker. In some implementations, the process 500 employs a two-step training technique. First, the TTS model 200 is pre-trained on an initial training data set 505 including spoken utterances from a large pool of speakers to obtain a backbone TTS model 200, resulting in synthesized speech in a generic voice. The next step of the two-step training technique involves training the stack of residual adapters 400 on adaption training data 510, while the parameters of the backbone TTS model 200 are frozen. The result is a TTS model 200 that is adapted, by the residual adapters 400, to synthesize speech in a voice of a target speaker. The training data 510 may include one or more spoken utterances (e.g., utterances 12 of FIG. 1) by a target speaker, where each spoken utterance is paired with corresponding input text 512 associated with a transcription of the spoken utterance.

Referring to FIG. 5, the process 500 starts with pre-training the TTS model 200 using pre-training data 505 (i.e., initial training data 505). Pre-training a model is a technique used for initializing a model which can then be further fine-tuned based on additional training data 510. For the TTS model 200, pre-training may include initiating the TTS model 200 synthesize text to speech in a generic voice. In some implementations, the pre-training data 505 does not include any utterances 12 spoken by the target speaker 10 (i.e., non-synthetic speech 513 from the training data 510 used to adapt the TTS model 200 to synthesize speech in the voice of the target speaker). Pre-training data 505 may include the spoken utterances paired with textual representations of the spoken utterances.

The process 500 can then adapt the TTS model 200 to synthesize speech in the voice of a target speaker using training data 510 to fine-tune one or more residual adapters 400 of the TTS model 200, while the parameters of the TTS model 200 are frozen after pre-training. That is, while the TTS model 200 is used to generate output 515 based on the input text 512, only the residual adapters 400 are optimized based on the determined loss 540. The training process may include fine-tuning any of the components 410, 420, 430, 440 of the residual adapters 400 (FIG. 4) separately or jointly in any suitable combination. The process 500 includes feeding a training input 510 to the TTS model 200. In some implementations, the training input 510 includes a plurality of spoken utterances from a target speaker (e.g., spoken utterances 12 of target speaker 10 of FIG. 1) including non-synthetic speech representations 513 of the target speaker 10 speaking the spoken utterance 12. Further, the training input 510 may include input training text 512 corresponding to a transcription of the spoken utterance of the target user (e.g., transcription 152 of utterance 12 of FIG. 1). The training data 510, including the input training text 512, may include corresponding sequences of phonemes and graphemes. In some implementations, the training data set 510 is completely different from the initial training data 505. For example, the initial training data 505 may be in a first language, and the training data set 510 may be in a second language. This allows the backbone TTS model 200 to be trained on a wider variety of pre-training data 505 while the adaptation using the residual adapters 400 can be trained on a target speaker having a significantly smaller set of training data 510.

Upon receiving the training input 510, the TTS model 200, augmented with the residual adapters 400, may generate an output 515 (e.g., a synthetic speech representation 261 from the corresponding input training text 512). The TTS model 200 may process the input training text 512 in the manner described with respect to any of FIGS. 1-4 or any other suitable manner for text-to-speech conversion. For example, referring to FIG. 2, the input training text 512 may be received by a BERT encoder 210 of the TTS model 200. The BERT encoder 210 may generate an encoded text representation 211 for the corresponding input text 512. A variance adapter 220 may receive a first concatenation output 212 including a speaker embedding and a stress embedding 205 concatenated with the encoded representation 211 generated by the BERT encoder. The variance adapter 220 may then generate an output 221 corresponding to the first concatenation 212. The duration adapter 230 may receive the first concatenation output 212 and predict a phoneme duration 231 for each phoneme in the corresponding input training text 512 based on the first concatenation output 212. In some implementations, the upsampler 240 receives a second concatenation output 213 including the first concatenation output 212 concatenated with the output 221 generated by the variance adapter 220. The upsampler 240 may then upsample the second concatenation. The Conformer decoder 300 may then receive the upsampled second concatenation output 241 and generate a synthetic speech representation 261 for the corresponding input text 512. In this example, the synthetic speech representation 261 of FIG. 2 may correspond to the output 515 of FIG. 5. Further, in training the residual adapter 400, one or more stacks of residual adapters 400 may be inserted in any of the components of the TTS model 200 as necessary to adapt the TTS model 200 to synthesize speech in the voice of a target speaker.

In some implementations, the output 515 is used by a loss function 530 to generate a loss 540. That is, the loss function 530 compares the output 515 and the spoken utterance by the target speaker to generate the loss 540, where the loss 540 indicates a discrepancy between the non-synthesized speech 513 corresponding to the spoken utterance from the target speaker (i.e., the target output) and the synthesized speech generated by the TTS model 200 from the input text 512 (i.e., output 515). The loss function 350 may implement any suitable technique to determine a loss such as regression loss, mean squared error, mean squared logarithmic error, mean absolute error, binary classification, binary cross entropy, hinge loss, multi-class loss, etc.

The loss 540 may then be fed directly to the TTS model 200. Here, the TTS model 200 is frozen and thus processing the loss 540 includes adjusting only one or more parameters of the residual adapters 400 to account for the loss 540. In some implementations, one or more of the residual adapters 400 includes a speaker embedding used for speaker conditioning in the TTS model 200. For example, the speaker embedding may be extracted from a reference mel spectrogram of the target speaker and/or adapting a speaker embedding, from a table of speaker embeddings, that most closely resembles a timbre of the target speaker. Here, optimizing the residual adapter 400 includes optimizing the speaker embedding associated with the target speaker.

FIG. 6 is a flowchart of an exemplary arrangement of operations for a computer-implemented method 600 of implementing residual adapters for few-shot text-to-speech speaker adaptation. The method 600 may be performed, for example, by various elements of the example speech environment 100 of FIG. 1 and/or the computing device 700 of FIG. 7. At operation 602, the method 600 includes obtaining a text-to-speech (TTS) model 200 configured to convert text 152 into representations of synthetic speech 261, the TTS model 200 pre-trained on an initial training data set 505. At operation 604, the method 600 includes augmenting the TTS model 200 with a stack of residual adapters 400. At operation 606, the method 600 includes receiving an adaption training data set 510 including one or more spoken utterances 12 spoken by a target speaker 10, each spoken utterance 12 in the adaptation training data set 510 paired with corresponding input text 512 associated with a transcription of the spoken utterance 12. At operation 608, the method 600 includes adapting, using the adaption training data set 510, the TTS model 200 augmented with the stack of residual adapters 400 to learn how to synthesize speech in a voice of the target speaker 10 by optimizing the stack of residual adapters 400 while parameters of the TTS model 200 are frozen.

Figure 7:
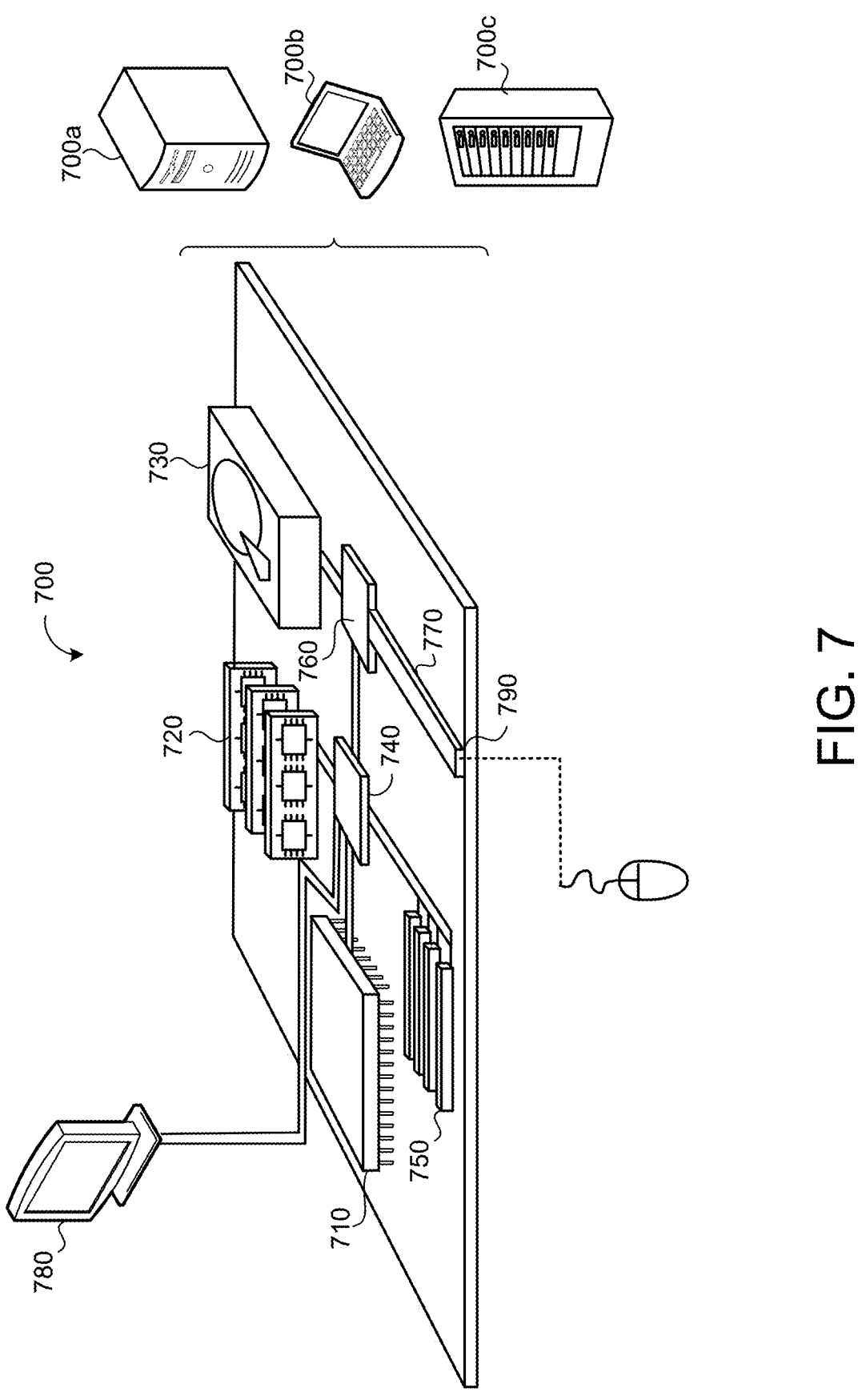
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

16

What is claimed is:

1. A computer-implemented method when executed by data processing hardware causes the data processing hardware to perform operations comprising:

obtaining a text-to-speech (TTS) model configured to convert text into representations of synthetic speech, the TTS model pre-trained on an initial training data set, the TTS model comprising a decoder;

augmenting the TTS model with a stack of residual adapters by inserting the stack of residual adapters into the decoder;

receiving an adaption training data set comprising one or more spoken utterances spoken by a target speaker, each spoken utterance in the adaptation training data set paired with corresponding input text associated with a transcription of the spoken utterance; and adapting, using the adaption training data set, the TTS model augmented with the stack of residual adapters to learn how to synthesize speech in a voice of the target speaker by optimizing the stack of residual adapters while parameters of the TTS model are frozen.

2. The computer-implemented method of claim 1, wherein the decoder of the TTS model comprises a corresponding stack of multi-head self-attention layers.

3. The computer-implemented method of claim 2, wherein inserting the stack of residual adapters into the decoder such that each respective residual adapter in the stack of residual adapters is disposed between each multi-head self-attention layer in the corresponding stack of multi-head self-attention layers of the decoder.

4. The computer-implemented method of claim 3, wherein the decoder comprises a Conformer decoder comprising:

a first feedforward module;
a multi-head self-attention module;
a convolution module;
a second feedforward module; and
a layernorm module.

5. The computer-implemented method of claim 1, wherein:

each spoken utterance in the adaptation training data set comprises a corresponding non-synthetic speech representation of the target speaker speaking the spoken utterance; and the stack of residual adapters is optimized by:

for each spoken utterance in the adaption training data set, generating, using the TTS model augmented with the stack of residual adapters, a corresponding synthetic speech representation from the corresponding input text paired with the spoken utterance;

determining a loss based on the non-synthetic speech representations of the target speaker speaking the spoken utterances and the synthetic speech representations generated from the input text; and updating parameters of the stack of residual adapters based on the loss.

6. The computer-implemented method of claim 5, wherein the stack of residual adapters is further optimized by optimizing a speaker embedding associated with the target speaker.

7. The computer-implemented method of claim 1, wherein the initial training data set used to pre-train the TTS model does not include any utterances spoken by the target speaker.

8. The computer-implemented method of claim 1, wherein the input text paired with each corresponding spoken utterance in the adaption training data set comprises a corresponding sequence of phonemes and a corresponding sequence of graphemes.

9. The computer-implemented method of claim 1, wherein each respective residual adaptor in the stack of residual adapters comprises:
 a layernorm layer;
 a down-projection layer;
 a Rectified Linear Unit (ReLU) layer;
 an up-projection layer; and
 a residual connection.

10. The computer-implemented method of claim 1, wherein the TTS model comprises at least one of:
 a Bidirectional Encoder Representations from Transformers (BERT) encoder configured to:
  receive the corresponding input text for each spoken utterance in the adaption training data set; and
  generate an encoded text representation for the corresponding input text;
 a variance adapter configured to:
  receive a first concatenation output comprising a speaker embedding and a stress embedding concatenated with the encoded text representation generated by the BERT encoder; and
  generate an output corresponding to the first concatenation output;
 a duration adapter configured to:
  receive the first concatenation output; and
  predict a phoneme duration for each phoneme in the corresponding input text based on the first concatenation output; and
 an upsampler configured to:
  receive a second concatenation output comprising the first concatenation output concatenated with the output generated by the variance adapter; and
  upsample the second concatenation output,
 wherein the decoder is configured to:
  receive the upsampled second concatenation output; and
  generate a synthetic speech representation for the corresponding input text.

11. The computer-implemented method of claim 1, wherein:
 the initial training data set pre-trains the TTS model to synthesize speech in a first language; and
 each spoken utterance in the adaptation training data set is spoken by the target speaker in a second language different than the first language.

12. A system comprising:
 data processing hardware; and
 memory hardware in communication with the data processing hardware, the memory hardware storing instructions that when executed on the data processing hardware cause the data processing hardware to perform operations comprising:
  obtaining a text-to-speech (TTS) model configured to convert text into representations of synthetic speech, the TTS model pre-trained on an initial training data set, the TTS model comprising a decoder;
  augmenting the TTS model with a stack of residual adapters by inserting the stack of residual adapters into the decoder;
  receiving an adaption training data set comprising one or more spoken utterances spoken by a target speaker, each spoken utterance in the adaptation training data set paired with corresponding input text associated with a transcription of the spoken utterance; and
  adapting, using the adaption training data set, the TTS model augmented with the stack of residual adapters to learn how to synthesize speech in a voice of the target speaker by optimizing the stack of residual adapters while parameters of the TTS model are frozen.

13. The system of claim 12, wherein the decoder of the TTS model comprises a corresponding stack of multi-head self-attention layers.

14. The system of claim 13, wherein inserting the stack of residual adapters into the decoder such that each respective residual adapter in the stack of residual adapters is disposed between each multi-head self-attention layer in the corresponding stack of multi-head self-attention layers of the decoder.

15. The system of claim 14, wherein the decoder comprises a Conformer decoder comprising:
 a first feedforward module;
 a multi-head self-attention module;
 a convolution module;
 a second feedforward module; and
 a layernorm module.

16. The system of claim 12, wherein:
 each spoken utterance in the adaptation training data set comprises a corresponding non-synthetic speech representation of the target speaker speaking the spoken utterance; and
 the stack of residual adapters is optimized by:
  for each spoken utterance in the adaption training data set, generating, using the TTS model augmented with the stack of residual adapters, a corresponding synthetic speech representation from the corresponding input text paired with the spoken utterance;
  determining a loss based on the non-synthetic speech representations of the target speaker speaking the spoken utterances and the synthetic speech representations generated from the input text; and
  updating parameters of the stack of residual adapters based on the loss.

17. The system of claim 16, wherein the stack of residual adapters is further optimized by optimizing a speaker embedding associated with the target speaker.

18. The system of claim 12, wherein the initial training data set used to pre-train the TTS model does not include any utterances spoken by the target speaker.

19. The system of claim 12, wherein the input text paired with each corresponding spoken utterance in the adaption training data set comprises a corresponding sequence of phonemes and a corresponding sequence of graphemes.

20. The system of claim 12, wherein each respective residual adaptor in the stack of residual adapters comprises:
 a layernorm layer;
 a down-projection layer;
 a Rectified Linear Unit (ReLU) layer;
 an up-projection layer; and
 a residual connection.

21. The system of claim 12, wherein the TTS model comprises at least one of:
 a Bidirectional Encoder Representations from Transformers (BERT) encoder configured to:
  receive the corresponding input text for each spoken utterance in the adaption training data set; and
  generate an encoded text representation for the corresponding input text;

a variance adapter configured to:

receive a first concatenation output comprising a speaker embedding and a stress embedding concatenated with the encoded text representation generated by the BERT encoder; and generate an output corresponding to the first concatenation output;

a duration adapter configured to:

receive the first concatenation output; and predict a phoneme duration for each phoneme in the corresponding input text based on the first concatenation output; and an upsampler configured to:

receive a second concatenation output comprising the first concatenation output concatenated with the output generated by the variance adapter; and upsample the second concatenation output, wherein the decoder is configured to:

receive the upsampled second concatenation output; and generate a synthetic speech representation for the corresponding input text.

22. The system of claim 12, wherein:

the initial training data set pre-trains the TTS model to synthesize speech in a first language; and each spoken utterance in the adaptation training data set is spoken by the target speaker in a second language different than the first language.

\* \* \* \* \*